B. C. CLEVENGER.
CORN-STALK CUTTERS.

No. 194,332. Patented Aug. 21, 1877.

WITNESSES:
E. Wolff
J. H. Scarborough

INVENTOR:
B. C. Clevenger
BY
[signature]
ATTORNEYS.

UNITED STATES PATENT OFFICE.

BENJAMIN C. CLEVENGER, OF CHANUTE, KANSAS.

IMPROVEMENT IN CORN-STALK CUTTERS.

Specification forming part of Letters Patent No. 194,332, dated August 21, 1877; application filed April 23, 1877.

*To all whom it may concern:*

Figure 1:
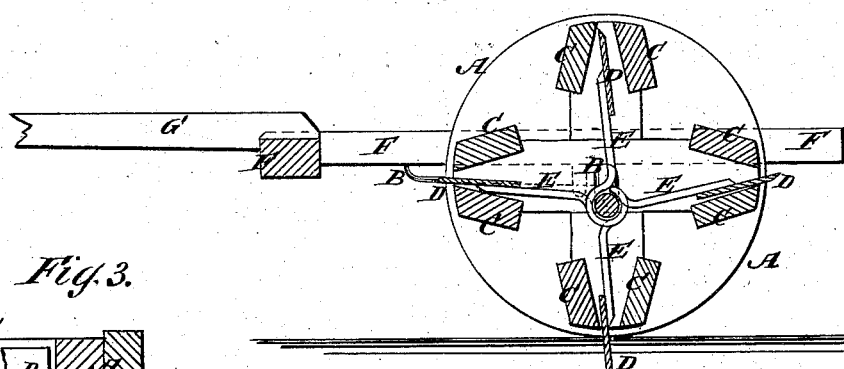
Figure 3:
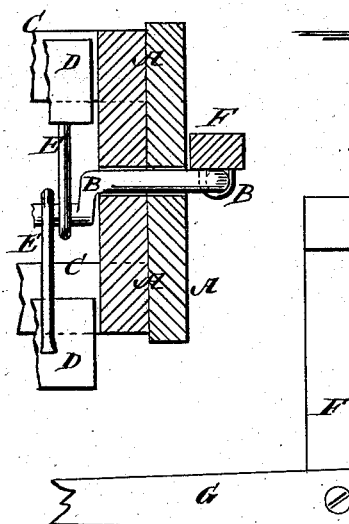
Figure 2:
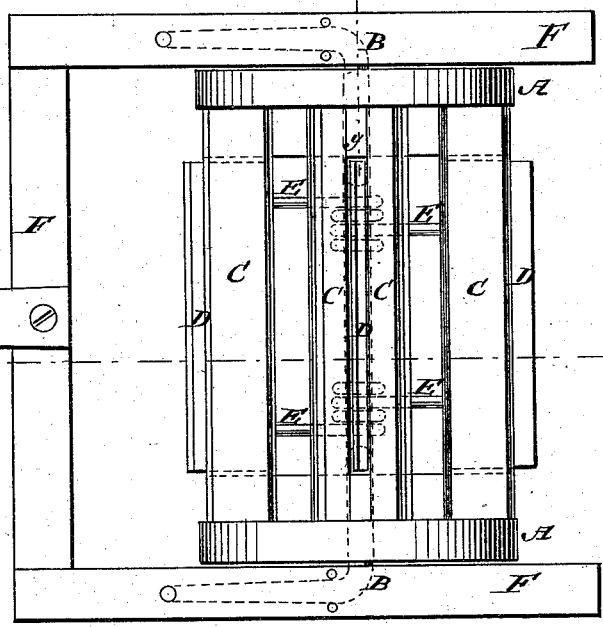

Be it known that I, BENJAMIN C. CLEVENGER, of Chanute, in the county of Neosho and State of Kansas, have invented a new and useful Improvement in Corn-Stalk Cutters, of which the following is a specification:

Figure 1 is a vertical longitudinal section of my improved machine, taken through the line $x\ x$, Fig. 2. Fig. 2 is a top view of the same. Fig. 3 is a detail section, taken through the line $y\ y$, Fig. 2.

Similar letters of reference indicate corresponding parts.

The invention relates to an improvement in the class of corn-stalk cutters in which blades are caused to project intermittingly through a slot in a revolving drum.

The invention consists in the construction of the drum, the distinguishing feature being the arrangement of the bars which form the guides for the blades, whereby the circular heads of the drum are rigidly connected and braced, and suitable slots or openings are formed, through which the blades may work in and out. The arrangement referred to consists in placing the outer edges of the bars close together, and their inner edges several inches apart, thereby securing the circular drum-heads rigidly together, and forming a narrow slit or opening sufficiently wide for the blades to work through, yet allowing space behind said openings for the vibratory movement of the blades.

A represents two wheels or circular heads, which revolve upon the journals of the axle B, and are connected by four or more pairs of cross-bars, C. The cross-bars C of each pair are so arranged as to leave a narrow opening between their outer edges, and a V-shaped space between their inner surfaces, to adapt them to serve as guides to the knives D in their outward and inward movements. The outer edges or rims of the heads or wheels A should project a little, say, an inch and a half, beyond the outer edges of the cross-bars C.

The construction of revolving frame or drum is the simplest possible, yet effective for its purpose.

The knives D are bolted or otherwise detachably attached to the outer ends of pairs of arms E, the inner ends of which are pivoted to the axle B.

The axle B is bent twice at right angles at the inner sides of the wheels A, so as to form a long crank, and its ends are attached to the frame F in such a way that the crank of the said axle may project downward, so that as the machine is drawn forward the knives D may project as they approach the ground, so as to cut the corn-stalks into pieces as they lie upon the ground.

The bent arms of the axle serve as a means for attaching it to the frame, the ends of the arms being turned upward and inserted in the frame, as indicated by dotted lines, Fig. 1. Said arms also hold the axle rigid or immovable in relation to the frame.

What I claim is—

In a corn-stalk cutter, the bars C C, in combination with the circular heads A A, those of each pair being arranged with their inner edges separated, and outer edges near each other, as shown and described, for the purpose specified.

BENJAMIN C. CLEVENGER.

Witnesses:
L. ROSENTHAL,
JNO. P. CONE.